United States Patent [19]

Demarest, Jr.

[11] 4,406,683
[45] Sep. 27, 1983

[54] METHOD OF AND APPARATUS FOR REMOVING GAS INCLUSIONS FROM A MOLTEN GLASS POOL

[75] Inventor: Henry M. Demarest, Jr., Natrona Heights, Pa.

[73] Assignee: PPG Industries, Inc., Pittsburgh, Pa.

[21] Appl. No.: 327,330

[22] Filed: Dec. 4, 1981

[51] Int. Cl.³ .............................................. C03B 5/20
[52] U.S. Cl. ...................................... 65/134; 65/135; 65/136; 65/347
[58] Field of Search ................... 65/135, 136, 134, 347

[56] References Cited

U.S. PATENT DOCUMENTS

| | | |
|---|---|---|
| 1,631,204 | 7/1927 | Hitchcock . |
| 1,641,898 | 9/1927 | Neenan . |
| 1,744,359 | 1/1930 | Brown . |
| 2,688,469 | 9/1954 | Hohmann . |
| 3,244,496 | 4/1966 | Apple et al. . |
| 3,265,485 | 8/1966 | Carney et al. . |
| 3,321,289 | 5/1967 | Touvay . |
| 3,498,779 | 3/1970 | Hathaway . |
| 3,771,984 | 11/1973 | Demarest . |
| 3,909,227 | 9/1975 | Dickinson . |
| 3,976,464 | 8/1976 | Wardlaw . |
| 3,989,497 | 11/1976 | Dickinson . |
| 4,023,950 | 5/1977 | Glaser . |
| 4,046,546 | 9/1977 | Hynd . |
| 4,052,186 | 10/1977 | Rhodes . |

OTHER PUBLICATIONS

Effect of Molten-Glass Blocking Devices in Furnaces on the Process of Cooling Sheet Glass, V. S. Pavlov et al., "Science for the Glass Industry", Jun. 1976, pp. 348-351.

Primary Examiner—Arthur D. Kellogg
Attorney, Agent, or Firm—Dennis G. Millman; Lee Patch

[57] ABSTRACT

Removal of gas inclusions from a molten glass pool is enhanced by inserting a gas inclusion-permeable, refractory metallic or ceramic screen in the downstream flowing, upper portion of the pool, to diminish the glass flow rate adjacent the surface by viscous drag forces while permitting gas inclusions to rise through the screen to the surface of the molten glass pool to dissipate into the atmosphere therealong.

12 Claims, 5 Drawing Figures

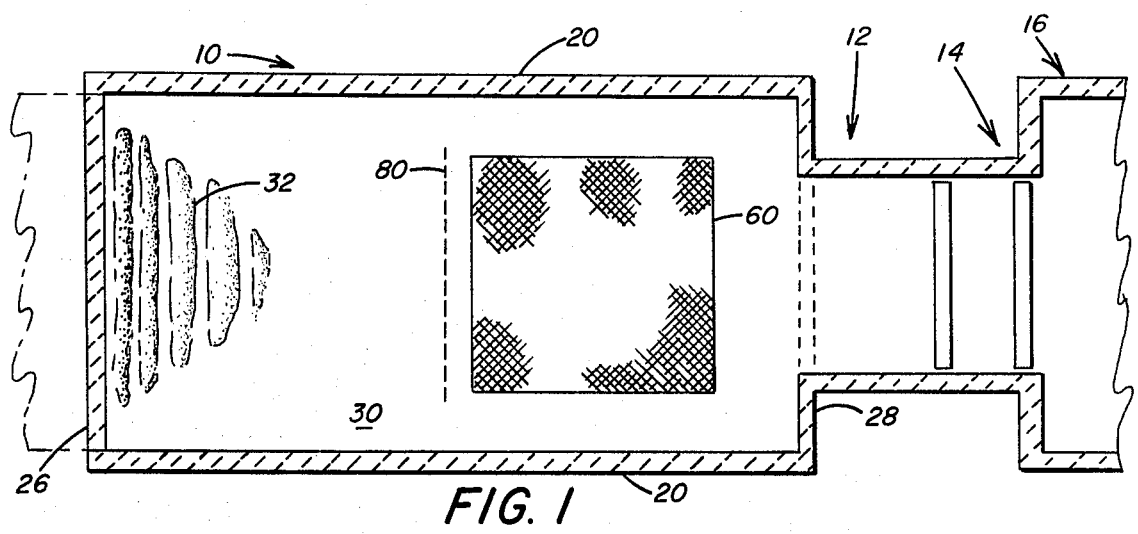
FIG. 1
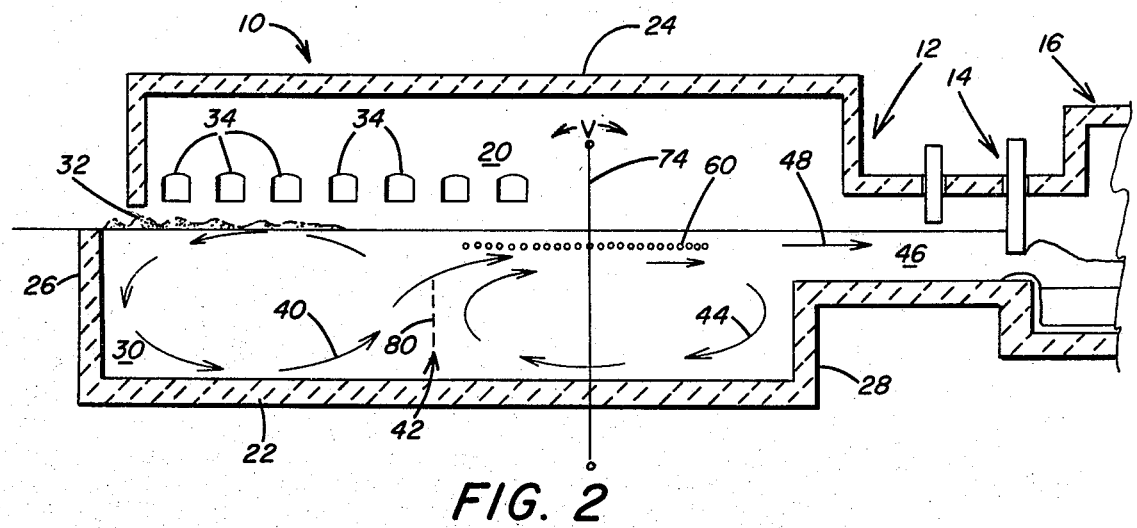
FIG. 2
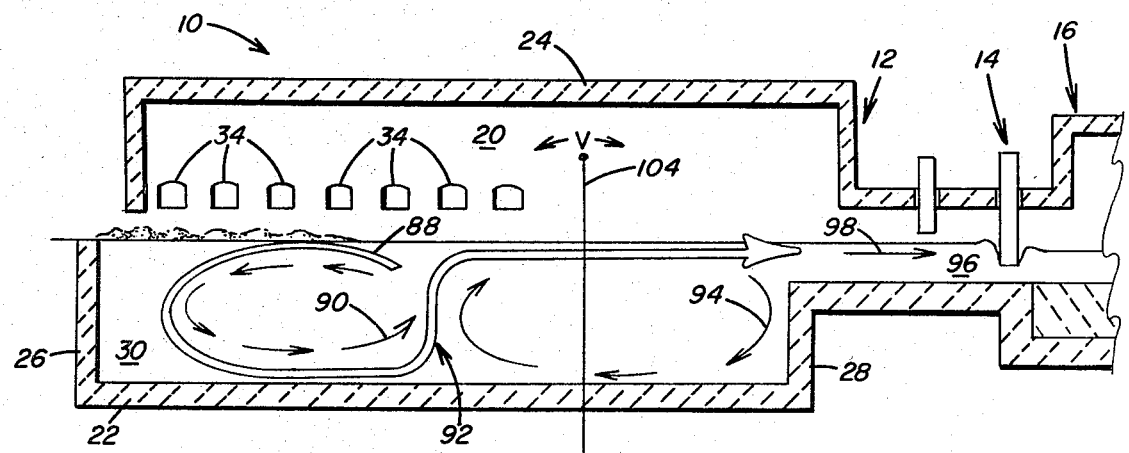
PRIOR ART  FIG. 3

METHOD OF AND APPARATUS FOR REMOVING GAS INCLUSIONS FROM A MOLTEN GLASS POOL

BACKGROUND OF THE INVENTION

1. Field of the Invention

This invention relates to the production of glass with a reduced incidence of gas inclusions in the final product. More particularly, the invention relates to a method of acting on molten glass contained in a glass melting furnace to encourage the accumulation of gas inclusions at the surface of the molten glass and to provide such gas inclusions sufficient residence time upon the surface to promote their dissipation into the furnace atmosphere.

2. Discussion of the Technical Problem

In the making of a flat glass ribbon, it is desirable to withdraw a stream of molten glass from the exit end of a glass melting furnace which is substantially free of gas inclusions, or seeds. Gas inclusions remaining in the withdrawn stream of molten glass may pass downstream and enter the final product, e.g., a ribbon of float glass, to form a defect therein.

Commonly, heat is applied within a glass melting furnace in a manner which generates a pattern of thermally induced convection flows in the pool of molten glass contained therein, including an outlet end flow pattern, an inlet end flow pattern, and a spring zone therebetween. Generally, the portions of the outlet and inlet end flow patterns moving adjacent the bottom of the pool converge together at the spring zone, where the molten glass then flows upwardly toward the surface of the molten glass pool. The upper portions of the outlet and inlet flow patterns then diverge, with the upper portion of the inlet end flow pattern moving toward the inlet end of the furnace. The upper portion of the outlet end flow pattern moves toward the outlet end of the furnace, where a portion is withdrawn as throughput. These flow patterns may be beneficial because they promote proper batch melting and homogenization, however, they also may disadvantageously promote the incidence of gas inclusions in the final glass product, e.g., a flat glass ribbon.

More particularly, it is desirable to maintain molten glass within the flow patterns of the molten glass pool for prolonged periods of time in order to provide opportunity for gas inclusions within the molten glass to rise toward the surface of the pool and either dissipate into the furnace atmosphere or dissolve into the molten glass. There has been identified, however, a current of flow within the molten glass pool that has a minimum residence time within the furnace (hereinafter minimum residence time flow) which tends to inhibit the removal of gas inclusions from the molten glass pool. As represented in FIG. 3, in a conventional glass melting operation there is a substantially endless inlet end flow pattern 90 and a substantially endless outlet end flow pattern 94 generally circumscribed by a minimum residence time flow 88, which moves along the indicated path at a relatively great rate toward the throughput stream 96. Gas inclusions in the molten glass tend to rise toward the surface of the molten glass pool, thereby entering and becoming entrained in the minimum residence time flow 88. Due to the relatively high flow rate of the minimum residence time flow 88, such entrained gas inclusions are swept downstream into the throughput, rather than having sufficient time adjacent the surface of the molten glass pool to dissipate into the furnace atmosphere or dissolve into the glass. This effect increases the incidence of gas inclusions in the throughput stream, with a corresponding increased incidence of gas inclusion defects in the final product.

Techniques have been utilized to control patterns of glass flow within a glass melting furnace and/or to eliminate gas inclusions from the molten glass therein. For example, U.S. Pat. Nos. 1,631,204 to Hitchcock; 1,641,898 to Neenan; 3,771,984 to Demarest; 3,976,464 to Wardlaw, 3,989,497 to Dickinson et al; 4,023,950 to Glaser; 4,046,546 to Hynd; and 4,052,186 to Rhodes each generally teach physical barriers, e.g., skimmers, floaters, etc., which act upon the upper surface of a pool of molten glass in a glass melting furnace to affect flow patterns therein. Such barriers are limited, however, to providing a localized damming effect, permitting a minimum residence time flow to accelerate thereunder while retaining entrained gas inclusions.

U.S. Pat. No. 3,321,289 to Touvay generally teaches a rotatable baffle member which may be immersed within the pool of molten glass adjacent the floor of a glass melting furnace to alter flow patterns therein.

U.S. Pat. Nos. 1,744,359 to Brown; 2,688,469 to Hohmann; 3,244,496 to Apple et al; 3,498,779 to Hathaway; and 3,909,227 to Dickinson generally teach perforated members, e.g., screens, which are immersed into a pool of molten glass generally transverse to the direction of glass flow. The molten glass generally passes through the openings in the perforated members to screen out undesirable elements and to promote homogenization of the glass.

U.S. Pat. No. 3,265,485 to Carney et al. generally teaches a method of melting glass wherein glass flow patterns are controlled by internally cooling preselected areas of the pool with a plurality of elongated cooling elements. While thermal activity might be utilized to control the patterns of flow within a glass melting furnace, such a technique might not prove beneficial in removing gas inclusions. For example, to diminish the rate of flow of the minimum residence time flow 88 adjacent the surface of the pool by cooling might also create a high viscosity surface layer, or "skin", which would impede the rise of gas inclusions toward the surface.

Thus, while the teachings of each of the above-referenced patents may be advantageously practiced, there still remains a need in the glass-making art for a method whereby the pattern of glass flow within a glass melting furnace may be controlled to facilitate the removal of gas inclusions from the molten glass prior to their passing downstream into the final product.

SUMMARY OF THE INVENTION

The present invention provides a method of controlling the pattern of flow in a pool of molten glass to reduce the incidence of gas inclusion defects in the final glass product. The pool is contained in a glass melting chamber having an inlet end, an outlet end, and chamber atmosphere above the pool of molten glass. The pattern of flow includes a selected portion adjacent the surface of the molten glass pool which moves toward the outlet end of the chamber at a rate of flow. A gas inclusion-permeable, flow-parallel surface, e.g., a refractory screen of a ceramic or metallic material, is positioned in a generally horizontal orientation in contact with and effectively parallel to the selected portion of the flow pattern to diminish the flow rate thereof by viscous drag forces generated along the flow-parallel surface. In this manner, gas inclusions in the molten glass are able to rise through the flow-parallel surface toward the surface of the molten glass pool, and as a result of the diminished flow rate therealong, reside for an extended time along the surface of the molten glass pool to increase the rising and dissipation of the gas inclusions into the chamber atmosphere, i.e., increase dissipation time. Preferably the flow-parallel surface is maintained at an operating temperature at least about substantially equal to the temperature of the molten glass in the selected portion of the flow pattern, e.g., by immersing it into the molten glass without heating or cooling means, preferably to maintain a temperature/depth profile in the region of practice of the present invention wherein glass temperature generally decreases with depth, to further promote the rising of gas inclusions toward the surface of the molten glass pool.

DESCRIPTION OF THE DRAWING

FIG. 1 is a plan view of a glass melting furnace having portions removed for purposes of clarity, showing refractory screens positioned according to the practice of the present invention.

FIG. 2 is an elevated side view of the glass melting furnace shown in FIG. 1, further showing patterns of molten glass flow within the furnace.

FIG. 3 is a view similar to the view of FIG. 2, showing patterns of molten glass flow commonly found in prior art glass melting furnaces in the absence of practicing the present invention.

DESCRIPTION OF THE INVENTION

Figure 4:
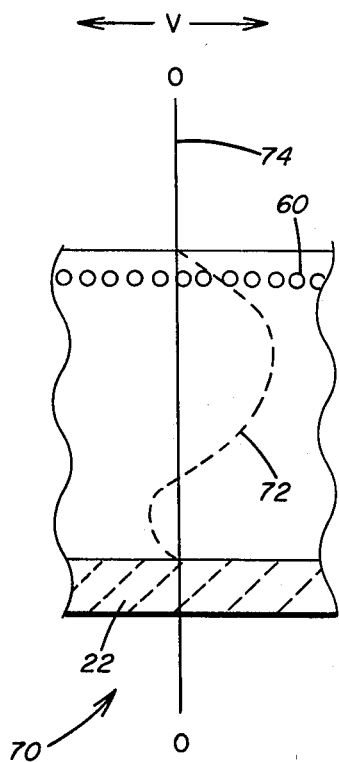
FIG. 4 is a graphical representation of molten glass flow velocities achieved in accordance with the practice of the present invention.

With reference to FIGS. 1 and 2, there is generally shown a glass melting furnace 10 in which a molten glass pool 30 is contained, a canal region 12 through which a stream of molten glass passes downstream, and a delivery facility 14 for metering the stream of molten glass into a glass forming chamber 16, e.g., a float chamber.

The glass melting furnace 10 generally includes refractory sidewalls 20, a refractory bottom 22 and roof 24 (shown only in FIG. 2), a refractory inlet end wall 26 and a refractory outlet end wall 28 to form a chamber for containing a pool 30 of molten glass. Glass batch materials 32 are commonly fed onto the molten glass pool 30 adjacent the inlet end wall 26, and float downstream while being subjected to intense heat from flames emitted from a plurality of ports 34 (shown only in FIG. 2) located in the refractory sidewalls 20. As represented in the Figures, the glass batch material 32 melts as it flows downstream and becomes incorporated into the molten glass pool 30.

As before mentioned, heat is commonly applied within the glass melting furnace 10 in a manner which generates a pattern of thermally induced convection flows within the molten glass pool 30. Referring to FIG. 2, although not limiting to the invention, there is shown by arrowed line segments a common form of such convection flows, including an inlet end flow pattern 40, a spring zone 42, and an outlet end flow pattern 44.

The inlet end flow pattern 40 describes a generally circulating pattern relative to the longitudinal dimension of the glass melting furnace 10, wherein the upper portion thereof moves in a generally upstream direction toward the inlet end wall 26 and the lower portion thereof moves in a generally downstream direction toward the outlet end wall 28.

The outlet end flow pattern 44 describes a circulating pattern generally opposite to the inlet end flow pattern 40, including an upper portion moving in a generally downstream direction and a lower portion moving in a generally upstream direction. The upper portion of the outlet end flow pattern 44 contributes to the throughput stream 46 which exits the glass melting furnace 10 in the direction of the arrow 48.

The spring zone 42 comprises an area of the glass melting furnace 10 intermediate the inlet end flow pattern 40 and the outlet end flow pattern 44, where the lower portions of the respective flow patterns 40 and 44 converge while moving in opposite directions. The molten glass in the spring zone 42 flows generally upwardly toward the surface of the molten glass pool 30.

Figure 5:
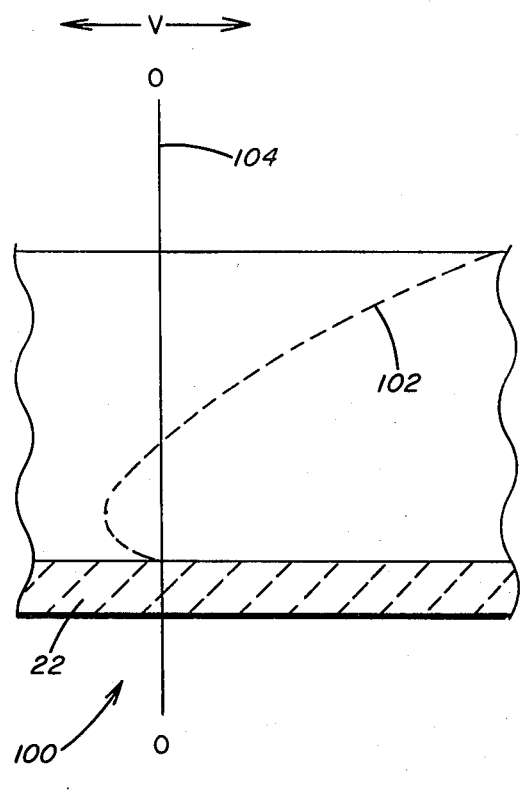
FIG. 5 is a graphical representation of molten glass flow velocities commonly present in the glass melting furnace represented in FIG. 3.

The present invention provides a method of removing gas inclusions from the outlet end flow pattern 44 before they are able to enter the throughput stream 46 to create defects in the final glass product. A better appreciation of the present invention will be facilitated by a discussion of conditions usually found in a glass melting furnace without the benefit of the present invention. Accordingly, there is shown in FIG. 3 an inlet end flow pattern 90, an outlet end flow pattern 94, a spring zone 92 therebetween, a throughput stream 96 flowing downstream in the direction of arrow 98, and a minimum residence time flow 88. With reference to FIG. 5, there is shown a graphical representation 100 of the velocity/depth gradient which could exist in a common outlet end flow pattern 94 at the location of vertical line 104, in a glass melting furnace as shown in FIG. 3. Curved line 102 shows, in general, the magnitude and direction of the flow velocity of the molten glass with respect to its depth at the position in the glass melting furnace indicated by line 104. The vertical line 104 also represents zero velocity, with portions of line 102 to the right thereof representing downstream velocities and portions to the left thereof representing upstream velocities. As can be appreciated from the shape of line 102, the portion of the outlet end flow pattern 94 adjacent the surface of the molten glass pool 30 (corresponding to the minimum residence time flow 88) has a maximum downstream velocity, with velocity decreasing therefrom as the depth increases. It has been determined that such a velocity/depth gradient may be disadvantageous and may contribute to an undesirable incidence of gas inclusions which enter into the throughput stream.

Generally, gas inclusions may exist in the molten glass pool 30 due to air entrapped in the granular batch materials 32; due to gas emitted during chemical reactions which occur during melting; and due to gas which leaves solution in the molten glass during temperature changes thereof. Such gas inclusions may be comprised of $SO_2$, $CO_2$, or $N_2$, among others. Generally, gas inclusions in the molten glass pool 30 tend to rise toward the surface of the pool 30, where it is possible for them to dissipate into the furnace atmosphere thereabove. However, in reference to the velocity/depth gradient represented in FIG. 5, it will be appreciated that gas inclusions rising toward the surface of the molten glass pool 30 in the outlet end flow pattern 94 will encounter an ever-increasing rate of downstream flow, i.e., the minimum residence time flow 88, which tends to sweep the gas inclusions downstream into the throughput stream before they have enjoyed a sufficient residence time adjacent the surface of the pool 30 to allow either dissipation into the furnace atmosphere or dissolution into the molten glass.

With reference to FIG. 2, the present invention provides a method of facilitating the rising and dissipation of gas inclusions from the molten glass pool 30 by controlling the outlet end flow pattern 44. The method includes positioning a gas inclusion-permeable, flow-parallel surface in a generally horizontal orientation in contact with and effectively parallel to the upper portion of the outlet end flow pattern 44, i.e., within the minimum residence time flow 88 of FIG. 3. Such a step diminishes the downstream flow rate of the contacted portion of flow by viscous drag forces generated along the flow-parallel surface. In this manner, gas inclusions in the outlet end flow pattern 44 are able to rise through the flow-parallel surface toward the surface of the molten glass pool 30 and reside therealong for an extended dissipation time, due to the diminished flow rate therealong. The extended dissipation time adjacent the surface allows for increased rising and dissipation of the gas inclusions into the furnace atmosphere as well as increased dissolution of gas inclusions into the cooling molten glass, thereby effecting a corresponding decrease in the incidence of gas inclusions in the throughput stream 46.

According to the present invention, and with reference to FIGS. 1 and 2, a refractory ceramic or metallic screen 60 is inserted into the upper portion of the outlet end flow pattern 44 in a generally horizontal orientation parallel to the direction of flow. Preferably the screen 60 is immersed just below the surface of the molten glass pool 30, i.e., into the minimum residence time flow 88 of FIG. 3, such that both its upper and lower flow-parallel surfaces are in contact with flowing molten glass. In this manner both the upper and lower flow-parallel surfaces are effective in generating viscous drag forces to diminish the rate of glass flow therealong. Although not limiting to the invention, the screen 60 preferably extends across at least the central half of the molten glass pool, (as shown in FIG. 1). Further, the screen 60 preferably extends longitudinally from just downstream of the spring zone 42 to about two-thirds of the distance to the outlet end wall 28. In this manner, the minimum residence time flow 88 is engaged over a substantial portion thereof.

The screen 60 is preferably formed of a material which is compatible with the high temperatures of a glass melting furnace and is relatively unaffected by contact with the molten glass. Thus, although not limiting to the invention, the screen 60 may be formed of a refractory ceramic, e.g., fused quartz, or a refractory metal, e.g., platinum, molybdenum or tungsten. The screen 60 is preferably a foraminous thin sheet, having a thickness as small as possible while retaining structural integrity for handling during insertion and normal usage, e.g., a thickness less than about one inch (2.5 cm.) and preferably less than about 0.1 inch (0.25 cm.). A refractory metal screen 60 may be formed of woven metal strand, or it may take the form of a perforated thin sheet. A refractory ceramic sheet 60 will generally take the form of a perforated thin sheet.

With reference to FIG. 4, there is shown a graphical representation 70 of a velocity/depth gradient which is preferably generated in the outlet end flow pattern 44 by the practice of the present invention. The line 72 represents the magnitude and direction of the flow velocity with respect to depth, with vertical line 74 indicating the location under consideration and representing zero velocity. As can be appreciated from the shape of line 72, the velocity of the flow adjacent the surface of the molten glass pool 30 is minimized in accordance with the practice of the present invention, to provide gas inclusions therealong an extended dissipation time during which to rise and dissipate into the furnace atmosphere, rather than be swept into the throughput stream 46.

Preferably in the practice of the invention the screen 60 is maintained at an operating temperature which is substantially equal to the temperature of the molten glass flowing therealong, i.e., the screen 60 need not be a cooled or heated member. In this manner, in accordance with the practice of the present invention, the temperature of the upper portion of the flow pattern 44 is preferably maintained at a value which is equal to or greater than the temperature of the molten glass therebelow, to thereby facilitate the rise of gas inclusions toward the surface of the molten glass pool 30. Preferably, a temperature/depth gradient is established in the outlet end flow pattern 44 in which the surface portion has a maximum temperature and the temperature decreases therefrom with depth. Thus, the rise of gas inclusions will be facilitated as they pass from relatively low viscosity molten glass upward into higher viscosity molten glass.

Referring again to FIGS. 1 and 2, a second refractory screen 80 may additionally be utilized in the practice of the present invention. The screen 80 is preferably inserted in a substantially vertical orientation in the spring zone 42. In this embodiment of the invention, the screen 80 is oriented substantially parallel to the flow of molten glass adjacent thereto and accordingly there are generated viscous drag forces along the flow-parallel surfaces thereof which tend to diminish the flow rate of the molten glass therealong. By positioning the screen 80 adjacent the outlet end of the spring zone 42, as shown in FIG. 2, the upward rate of flow of the molten glass which subsequently enters the upper portion of the outlet end flow pattern 44, i.e., the flow corresponding to the minimum residence time flow 88 of FIG. 3, may be reduced, thus contributing to the effect of screen 60 in reducing gas inclusions.

Screen 80 may be substantially similar in composition and structure to screen 60 and preferably is maintained at an operating temperature substantially equal to the temperature of the molten glass flowing therealong, i.e., uncooled and unheated. While not limiting to the invention, screen 80 is preferably positioned across the central half of the molten glass pool 30, as the minimum residence time flow 88 of FIG. 3 is generally limited to this central region due to viscous drag forces generated along the sidewalls 20.

EXAMPLE

A small scale or pilot glass melting furnace was operated to melt glass cullet to provide molten glass which flowed into a flat glass forming chamber. Measurements made on a 12 inch (30.5 cm.) representative sample of a 4 13/16 inch wide (12.2 cm.), 3/16 inch thick (0.48 cm.) flat glass ribbon withdrawn from the forming chamber prior to the practice of the present invention revealed about 320 visually observable gas inclusions in the glass product. Of the observed gas inclusions, the largest had a length of about 7/16 inch (1.1. cm.) and a width of about ⅛ inch (0.3 cm.) and the vast majority of the gas inclusions appeared on the upper surface of the glass in a fairly uniform distribution thereover.

A refractory screen 60 was provided in the form of a 1 inch (2.5 cm.)×24 inch (60 cm.)×6 inch (15 cm.) sheet of clear fused quartz, with 1 inch (2.5 cm.) holes formed therethrough on 3 inch (7.5 cm.) centers. The screen 60 was inserted into the glass melting furnace in contact with and partially immersed into the surface of the molten glass pool, in a generally horizontal orientation parallel to the forward flow adjacent the outlet end thereof. After insertion of the screen 60 and without substantially making any other changes in the melting or forming processes, it was visually observed that a substantially increased number of gas inclusions or bubbles resided on the surface of the molten glass pool adjacent the location of screen 60. Measurements made on a 12 inch (30.5 cm.) representative sample of the glass ribbon withdrawn from the forming chamber after the insertion of the screen 60 revealed only about 160 visually observable gas inclusions, the largest being substantially smaller than 1/16 inch (0.16 cm.) in length and width, with the majority being barely discernable. Additionally, the gas inclusions were almost entirely limited to the marginal edge portions of the ribbon in two thin lines therealong.

It will be appreciated by one skilled in the art that the quality of glass produced by the small scale melting furnace such as the type utilized in the present example is significantly lower than that which is expected in a commercially operating large scale furnace, where glass flow patterns are significantly stronger, glass residence times are significantly longer, and where acceptable defect levels might be limited to one defect per 100 square feet of flat glass of ¼ inch (0.4 cm.) thickness. Nevertheless, it is believed that the practice of the present invention, when utilized with a commercial-scale glass melting furnace, may effect about a fifty percent reduction in the incidence of gas inclusion defects in the final product. Of course, the invention is not intended to be limited by the specific embodiments disclosed herein for illustrative purposes, but rather by the claims to follow.

I claim:

1. A method of removing gas inclusions from a pool of molten glass by controlling the pattern of flow therein, the molten glass pool contained in a chamber having an inlet end, an outlet end, and a chamber atmosphere over the molten glass pool, wherein the pattern of molten glass flow includes a selected portion adjacent to the surface of said molten glass pool moving toward said outlet end of said chamber at a rate of flow, comprising the steps of: positioning a substantially flat, foraminous, gas inclusion-permeable, flow-parallel surface in a generally horizontal orientation immersed in and effectively parallel to said selected portion of flow pattern to generate forces along said flow-parallel surface, to diminish said rate of flow by viscous drag, to permit gas inclusions in said molten glass to rise through said flow-parallel surface toward the surface of said molten glass pool to reside therealong for time sufficient for said gas inclusions to dissipate into said chamber atmosphere.

2. The method as set forth in claim 1 wherein said pattern of molten glass flow includes an inlet end portion flow pattern wherein an inlet end upper portion flow is generally directed toward said inlet end; a spring zone intermediate said inlet end and said outlet end wherein molten glass flows generally upward toward the surface of said pool of molten glass; an outlet end portion flow pattern wherein an outlet end upper portion flow generally moves toward said outlet end; wherein said selected portion lies in said outlet end upper portion flow.

3. The method as set forth in claim 2 wherein said flow-parallel surface is maintained at an operating temperature substantially equal to the temperature of the flow of molten glass therealong to permit the temperature and viscosity of said molten glass to remain substantially unaffected by contact therewith.

4. The method as set forth in claim 3 further comprising the step of:
maintaining a temperature/depth gradient within said outlet end upper portion flow wherein molten glass temperature generally increases as the distance from the surface of said pool of molten glass decreases, to facilitate the rise of said gaseous inclusions to the surface of said pool of molten glass.

5. The method as set forth in claim 2 wherein said flow-parallel surface is a first flow-parallel surface, wherein said selected portion is a first selected portion, wherein the pattern of molten glass flow includes a second selected portion passing through said spring zone, further comprising the step of:
positioning a second gas inclusion-permeable, flow-parallel surface in said second selected portion in a generally vertical orientation to diminish the rate of flow thereof.

6. The method as set forth in claim 1 or 5 wherein at least one of said flow-parallel surface is formed of a screen of a refractory metal.

7. The method as set forth in claim 1 or 5 wherein at least one of said flow-parallel surfaces is formed of a thin ceramic sheet having avenues therethrough for the passage of gas inclusions.

8. In glass melting apparatus including a chamber for containing a pool of molten glass, the chamber having an inlet end, an outlet end, and an atmosphere over a pool of molten glass having gas inclusions therein, wherein a pattern of flow is generated in said molten glass pool which includes a selected portion adjacent to the surface of said pool and moving toward said outlet end of said chamber, the improvement comprising: a substantially flat, foraminous, gas inclusion-permeable, flow-parallel surface generally horizontally oriented and immersed in and effectively parallel to said selected portion of said pattern of flow, said flow-parallel surface diminishing the rate of flow of said selected portion by viscous drag forces generated therealong and permitting gas inclusions in said molten glass pool to rise therethrough toward the surface of said molten glass pool to dissipate into said chamber atmosphere.

9. The glass melting apparatus as set forth in claim 8 wherein said pattern of flow includes an inlet end flow pattern having an upper portion generally directed toward said inlet end, a spring zone intermediate said inlet end and said outlet end in which molten glass flows generally upward toward the surface of said pool of molten glass, and an outlet end flow pattern having an upper portion generally directed toward said outlet end, wherein said selected portion lies within the upper portion of said outlet end flow pattern.

10. The glass melting apparatus as set forth in claim 9 wherein said flow-parallel surface comprises at least one surface of a screen formed of a refractory metal.

11. The glass melting apparatus as set forth in claim 9 wherein said flow-parallel surface comprises at least one surface of a thin ceramic sheet having avenues therethrough for the passage of gas inclusions.

12. The glass melting apparatus as set forth in claim 9 further comprising:
a second gas inclusion-permeable, flow-parallel surface generally vertically oriented in said spring zone, in contact with and effectively parallel to the generally upward flow in said spring zone.

* * * * *